(12) United States Patent
Delire et al.

(10) Patent No.: US 6,594,955 B1
(45) Date of Patent: Jul. 22, 2003

(54) VEHICLE DOOR WITH SEALED EQUIPMENT MODULE AND REMOVABLE INSERT IN THE TRIM PANEL

(75) Inventors: Philippe Delire, Beaumont (FR); Bruno Laurent, Binic (FR)

(73) Assignee: ArvinMeritor Light Vehicle Systems-France, Sully-sur-Loire (FR)

( * ) Notice: Subject to any disclaimer, the term of this patent is extended or adjusted under 35 U.S.C. 154(b) by 0 days.

(21) Appl. No.: 09/461,825

(22) Filed: Dec. 15, 1999

(30) Foreign Application Priority Data

Dec. 15, 1998 (FR) .......................................... 98 15840

(51) Int. Cl.⁷ ................................................. B60J 5/04
(52) U.S. Cl. ........................................................ 49/502
(58) Field of Search .......................... 49/502, 503, 348, 49/349; 296/146.7

(56) References Cited

U.S. PATENT DOCUMENTS

| | | | | |
|---|---|---|---|---|
| 5,050,347 A | * | 9/1991 | Brusasco ...................... | 49/502 |
| 5,617,676 A | | 4/1997 | Kleefeldt et al. | |
| 5,715,630 A | | 2/1998 | Szerdahelyi et al. | |
| 5,752,346 A | * | 5/1998 | Kritzler et al. ................ | 49/502 |
| 5,927,020 A | * | 7/1999 | Kobrehel ...................... | 49/502 |
| 6,029,403 A | * | 2/2000 | Bertolini et al. .............. | 49/502 |
| 6,076,882 A | * | 6/2000 | Szerdahelyi et al. .......... | 49/502 |

FOREIGN PATENT DOCUMENTS

| | | |
|---|---|---|
| DE | 19528467 A1 | 2/1997 |
| DE | 19709835 A1 | 9/1998 |
| FR | 2648762 | 6/1989 |

* cited by examiner

*Primary Examiner*—Jerry Redman
(74) *Attorney, Agent, or Firm*—Carlson, Gaskey & Olds

(57) ABSTRACT

Door (1) for a vehicle, in the interior face of which there is a lateral opening (4) comprising a door module (5) fitted with equipment including a lock (30) and a window lifter (6) with at least one rail (7, 8) for guiding cables (9, 11), this module comprising an interior trim panel (20) on which the said equipment items are mounted, characterized in that in the upper part of the panel (20) there is an opening (31), against the periphery of which there may be removably fitted an additional insert (32) which forms a constituent part of the said panel and to which a support (24) for the lock (30) is fixed. This arrangement allows the lock (30) to be removed, if necessary, from the door (1) after the module (5) has been assembled therewith, without having first of all to remove the entire trim panel (20); this extraction of the lock (30) can be achieved simply by removing the insert (32) to which it is secured. This opening gives access to the motor, window lifter and electronics so that one of these can be replaced if necessary.

3 Claims, 4 Drawing Sheets

VEHICLE DOOR WITH SEALED EQUIPMENT MODULE AND REMOVABLE INSERT IN THE TRIM PANEL

BACKGROUND OF THE INVENTION

The subject of the present invention is a motor vehicle door, in an interior face of which there is an opening, this door comprising a module fitted with equipment including a lock and a window lifter with at least one rail for guiding cables. The module includes an interior trim panel on which the said equipment items are mounted.

Patent FR-A-89/08550 (2,648,762) discloses a vehicle door comprising a panel forming an interior structure, and an interior trim panel fitted with various items of equipment pressed against the interior structure.

The system for holding the window lifter rail on the panel may be flexible and this rail is fixed at its lower end to a support and mounted in its upper part with freedom to move in a direction transverse to the overall plane of the module. The lock, secured to a lateral lug fixed to one of the rails of the window lifter, is fitted behind the interior panel of the door in which the lateral opening is made. This lock is connected by linkages to a device for controlling the opening of the door from the inside, this device usually being fixed to the interior panel of the door above the lateral opening.

Once the door module has been fitted, it is fixed to the interior panel of the door by appropriate means (screws) by virtue of an opening made in the upper part of the interior trim panel for allowing the introduction of screw-fastening tools.

These known arrangements have the following drawback: if after mounting and fixing the interior trim panel with its equipment items, the operator wishes to access the lock, the window lifter, the motor or its electronics, he has to remove the entire interior trim panel, which is a lengthy and tricky operation.

SUMMARY OF THE INVENTION

The object of the invention is to provide a vehicle door which is modified to eliminate this drawback.

According to the invention, the door is characterized in that in the upper part of the panel there is an opening, against the periphery of which there may be removably fitted an additional insert which forms a constituent part of the said panel and to which a support for the lock is fixed.

Thus, after the interior trim panel and all its equipment items have been fixed to the interior door panel, including the lock, it is possible to access this lock and extract it from the door without difficulty simply by removing the removable insert.

This removal of the insert raises no particular difficulty. According to one feature of the invention, the lock support is a lateral lug secured to the insert and on the end of which the lock is mounted.

According to another feature of the invention, the control for opening the lock from the inside is advantageously mounted on the insert.

As this control for opening from the inside is connected to the lock by an actuating linkage, removing the insert allows the lock and its control for opening from the inside to be extracted from the door at the same time.

Other particulars and advantages of the invention will emerge from the description which will follow, given with reference to the appended drawings which illustrate one embodiment thereof by way of non-limiting example.

DETAILED DESCRIPTION OF THE PREFERRED EMBODIMENT

Figure 1:
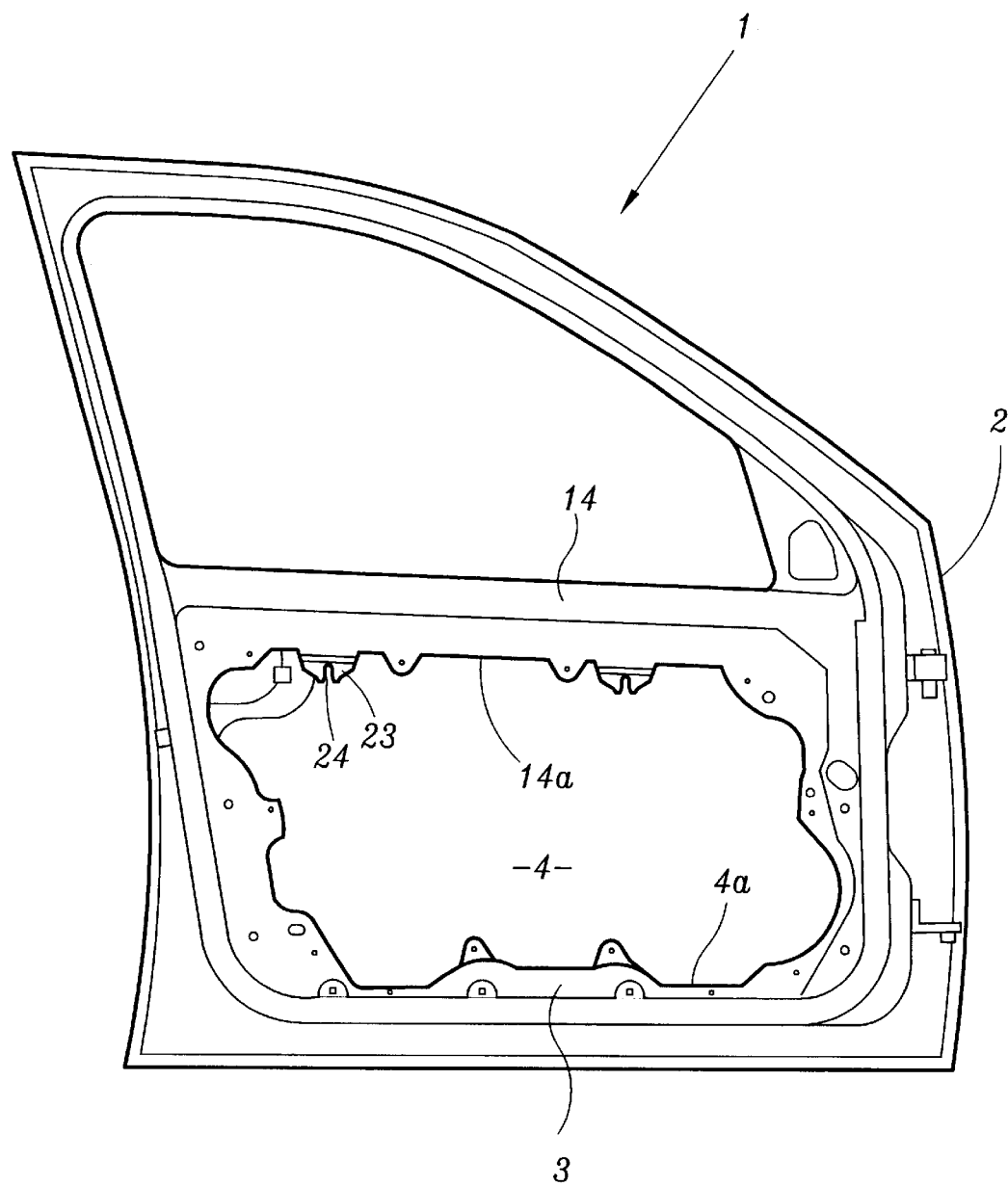
FIG. 1 is a view in elevation on a reduced scale of a vehicle left front door from the inside, without its sealed door module and showing the opening in which this module is mounted.

The vehicle door 1 illustrated in the drawings comprises an exterior panel 2 and an interior panel 3 in which there is a lateral opening 4. The structure of the door 1 is supplemented by a door module 5 consisting of an interior trim and sealing panel 20, made of an appropriate plastic, and of various equipment items, especially: a window lifter 6 of the type with two rails 7, 8 which are more or less parallel and vertical and designed to guide the window, and a lock 30.

The interior panel 20 is suitably profiled so as to exhibit an armrest 12 and a storage compartment 13. It is sized in such a way that its perimeter can press in a sealed manner against the periphery of the opening 4, which is delimited at its top by a strip 14 which strengthens the structure of the door 1, this strip having a lower edge 14a. The rails 7, 8 are flexible and fixed at their lower ends to support 15 consisting of a metal section piece designed to take screws 16 for fixing to the base of the interior panel 3, associated with nuts 27. The interior trim panel 20 is also mounted on the section piece 15.

Figure 3:
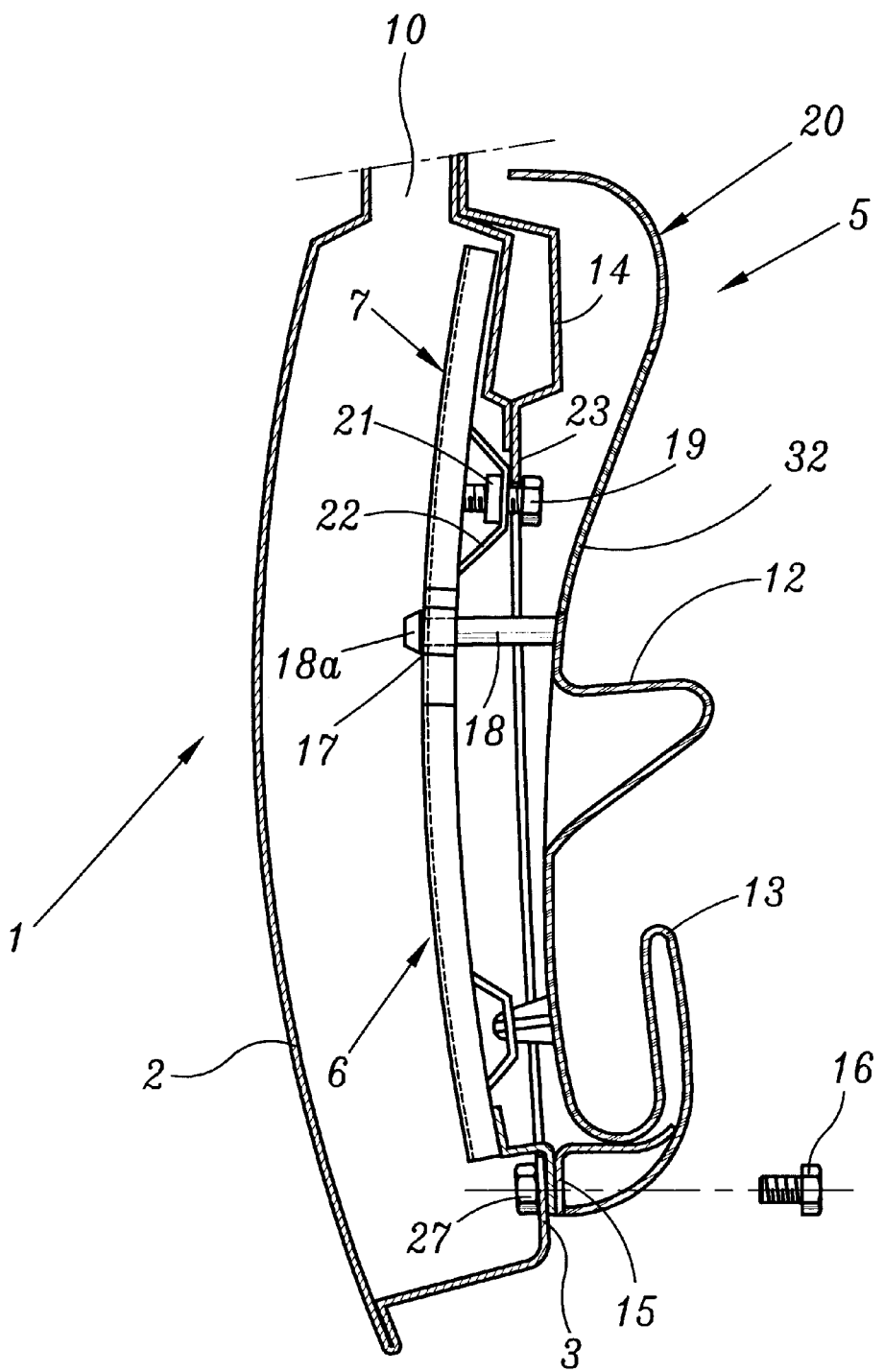
FIG. 3 is a view in vertical cross section on 3/3 of FIG. 2, showing the final phase of mounting the module on the door of FIG. 1.

The rails 7, 8 are connected to the panel 20 with the possibility of their upper part moving in the transverse direction. For this purpose, the module 5 is equipped (FIG. 3) with retaining studs 18, fixed to the trim panel 20 at an appropriate point, for example above the armrest 12 and below the insert 32. The opposite end of the stud 18 to the panel 20 engages in a receiving hole 17 made in the rail 7 As the head 18a of the stud 18 is enlarged, it presses against a flange of the hole 17 when the rails 7, 8 are moved their maximum distance away from the panel 20 (FIG. 3). Thus, the stud 18 holds the window lifter assembly 6 in this position.

By contrast, when the rails 7, 8 flex about their articulations to their lower attachments at the support 15, and move closer to the panel 20, the head 18a leaves the hole 17 and the rail 7 slides along the stud 18, towards the panel 20. This arrangement therefore allows the rails 7, 8 to be moved away from or towards the panel 20, by an amount which is defined by the length or the stud 18.

Formed in the upper part of the interior trim panel 20 is an opening 31, against the periphery of which there may be removably fitted an additional insert 32 which forms a constituent part of the panel 20, to which insert is fixed a support for the lock 30, this support consisting of a lateral lug 24. The lug 24 may also form an integral part of the insert 32, in which case it will be produced by a so-called moulding or injection-moulding method.

At one of its ends, the lug 24 is secured to the lock 30, and at its opposite end it is fixed to the interior face of the insert 32 by any means known per se such as screws, for example. The insert 32 may be fixed along its periphery to the edge of the opening 31, also by any appropriate means known per se such as clipping, welding, bonding, etc. for example.

The lock 30 is connected to a device 33 for controlling opening from the inside, which is advantageously fixed to the interior face of the insert 32 and connected to the lock 30 by actuating linkage 34 known per se and depicted diagrammatically.

Above the stud 18, the upper part of each rail 7, 8 is equipped with a system comprising screw 19 and nut 21 mounted on a support section piece 22 through which the screw 19 passes, this section piece 22 being fixed to the respective rail 7, 8. The head of the screw 19 can thus be moved away from or towards the section piece 22. Forks 23 delimit respective notches 24 on the edge 14a of the opening 4. The forks 23 project from the edge 14a of the opening 4. The forks 23 project from the edge 14a towards the screws 19, so that these screws can be introduced into the notches 24, then fixed to the forks 23 by screw fastening.

The door module 5 is mounted on the door 1 as follows: the insert 32, the lug 24 and the lock 30 together with the system (33, 34) for controlling opening from the inside and for locking having previously been detached from the remainder of the panel 20.

The rails 7, 8 are placed in their position of maximum separation from the sealing panel 20, the window lifter 6 being held in this separated position by resting the head 18a of the stud 18 on the flange of the hole 17 in the lug 24. Furthermore, the screws 19 or the fixing means adopted are unscrewed so as to leave a gap between their head and the support section pieces 22.

The operator introduces the upper ends of the rails 7, 8 into the opening 4 and causes them to cross the strip 14 so that the upper parts of the rails 7, 8 come behind this strip, above the lower edge 14a.

Next, the operator moves the window lifter 6 up inside the door 1 towards the window well 10 until the shanks of the screws 19 enter the notches 24, while the lower ends of the rails 7, 8 are level with the lower edge 4a of the opening 4. Finally, the operator pivots the rails 7, 8 and the entire module 5 in such a way as to allow the rails 7, 8 to cross the lower edge 4a so that these rails are then fully introduced into the interior volume of the door 1. To tighten the screws 19 onto the forks 23, the operator has ready access to the forks 23, as the insert 32 constitutes an inspection hatch. After this manoeuvre, the lock 30 borne by the lug 24 fixed to the insert 32 is introduced behind the interior panel 3 and then fixed thereto.

Finally, the door module 5 comes into its final position of assembly with the door 1, it being possible for that part of it which remains on the outside of this door to be fixed to the interior panel 3 by any appropriate means, particularly using nuts 27 and bolts 26.

It is also possible to install and assemble the module 5 to the door 1 with the insert 32, the lock 30 and the control 33 for opening from the inside. These elements are fitted in a single operation.

Figure 2:
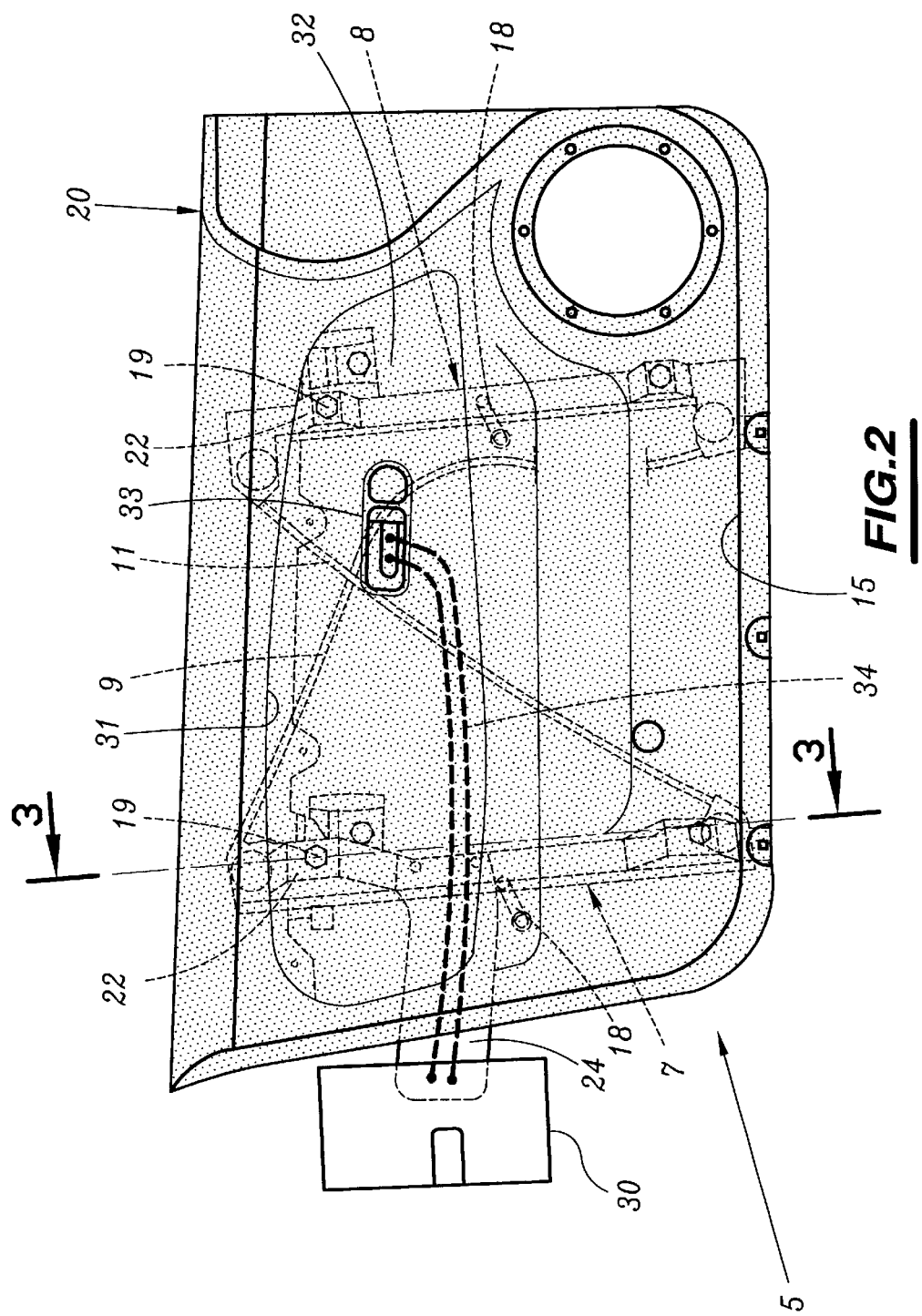
FIG. 2 is a perspective view of an embodiment of the door module according to the invention which is adapted for being mounted on the door of FIG. 1, this module being depicted from the side of its interior sealing panel.

Once the door module 5 has been assembled to the door 1, this assembly presents the form shown in FIG. 2. The motor (not depicted) of the window lifter 6 may be either fixed to the rail 7 or fixed to the interior sealing panel 20 by means known per se which are not depicted.

Figure 4:
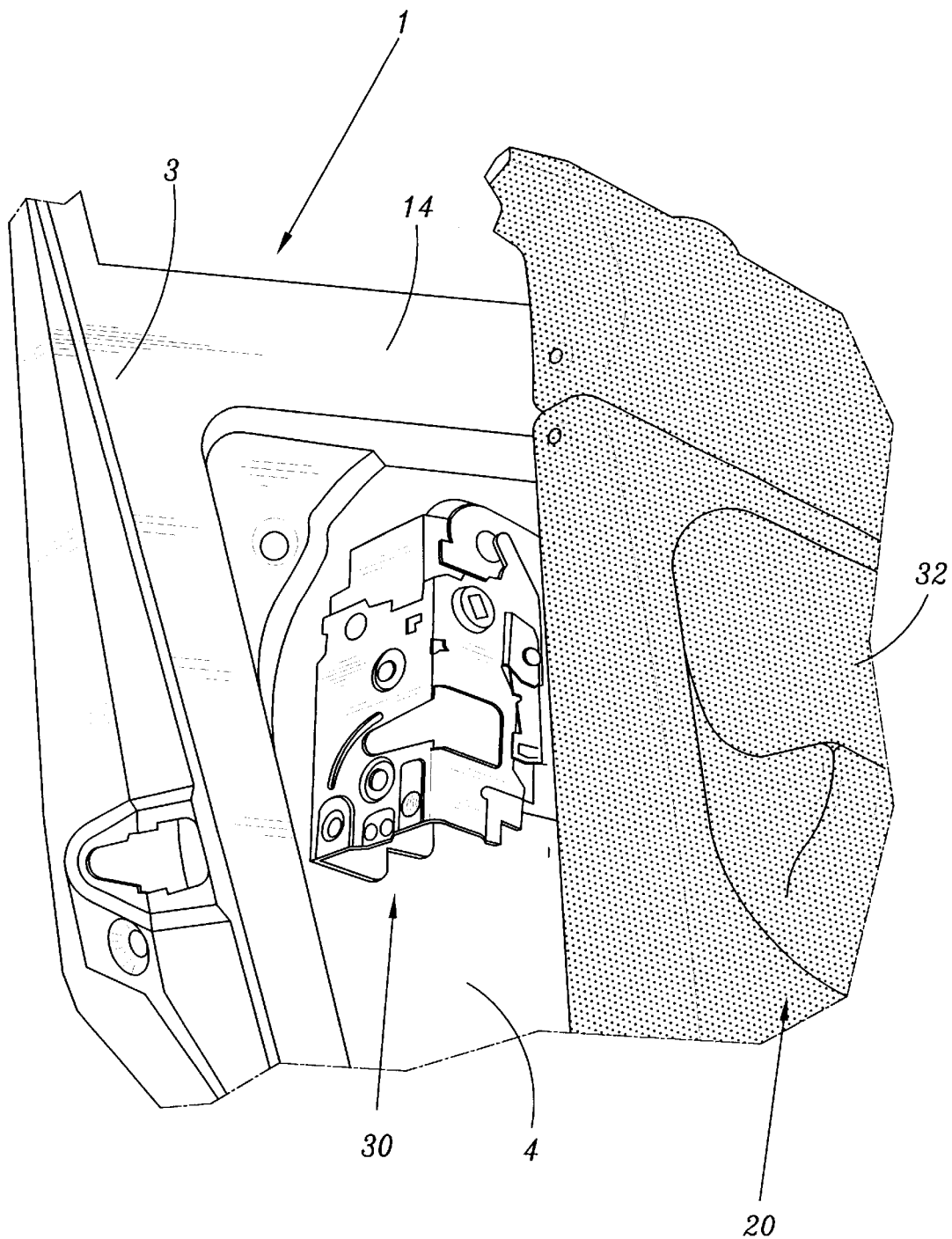
FIG. 4 is a view in partial exploded perspective on an enlarged scale of the interior panel of the door of FIG. 1, of the lock extracted therefrom and of the interior trim panel when the latter and the insert are secured together.

If, once the module 5 has been assembled to the door 1, the operator needs to work on the lock 30, he may easily detach the insert 32 from the rest of the panel 20 which remains fixed to the door 1. Extracting the insert 32 brings out the parts which are secured to it, that is to say the control 33 for opening from the inside, the linkage 34 and the lock 30. This extraction is achieved by a sideways initial movement to disengage the lock 30 from the interior panel 3 as far as the position illustrated in FIG. 4, in which it can be completely removed from the door. The reverse operation for re-fitting is performed in the same way.

Opening the insert 32 provides access to the motor, to the window lifter and to the electronic system so that this can be replaced if necessary.

The insert 32 may on its periphery have a sealing gasket of a type known per se, made of a supple material to allow it to be crushed.

The retaining stud 18 may advantageously be arranged at the upper parts of the rails 7, 8 above the insert 32.

According to an embodiment which is not as advantageous as the one illustrated in FIG. 2, the device 33 for controlling opening from the inside may be mounted on the upper part of the trim panel 20, in the region of the band 14.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A door for a vehicle, in an interior face of which there is a lateral opening comprising a door module fitted with equipment items including a lock and a window lifter with at least one rail for guiding cables, said module further including an interior trim panel on which said equipment items are mounted, wherein in an upper part of said trim panel there is an opening, against a periphery of which there is removably fitted an additional insert which forms a constituent part of said panel and to which a lock support for said lock is fixed, and said lock support is a lateral lug secured to said insert and on an end of which said lock is mounted.

2. A door for a vehicle, in an interior face of which there is a lateral opening comprising a door module fitted with equipment items including a lock and a window lifter with at least one rail for guiding cables, said module further including an interior trim panel on which said equipment items are mounted, wherein in an upper part of said trim panel there is an opening, against a periphery of which there is removably fitted an additional insert which forms a constituent part of said panel and to which a lock support for said lock is fixed, and said door further comprises a control for opening said lock from a vehicle interior which is mounted on said insert and connected to said lock by an actuating linkage.

3. A door for a vehicle, in an interior face of which there is a lateral opening comprising a door module fitted with equipment items including a lock and a window lifter with at least one rail for guiding cables, said module further including an interior trim panel on which said equipment items are mounted, wherein in an upper part of said trim panel there is an opening, against a periphery of which there is removably fitted an additional insert which forms a constituent part of said panel and to which a lock support for said lock is fixed, and said rail of said window lifter is connected to said trim panel and an upper part of said rail moves in a transverse direction, wherein said insert is fitted with a transverse stud for retaining said window lifter, said stud being fixed to said insert and able to slide in a slot in said upper part of the rail, said rail sliding over said stud away from or towards said insert.

* * * * *